Nov. 30, 1948.   J. C. LEONE   2,455,071
LATHE DOG

Filed Aug. 27, 1945   2 Sheets-Sheet 1

INVENTOR
Joseph C. Leone
by Heard Smith Tennant
ATTORNEYS

Nov. 30, 1948.   J. C. LEONE   2,455,071
LATHE DOG
Filed Aug. 27, 1945   2 Sheets-Sheet 2
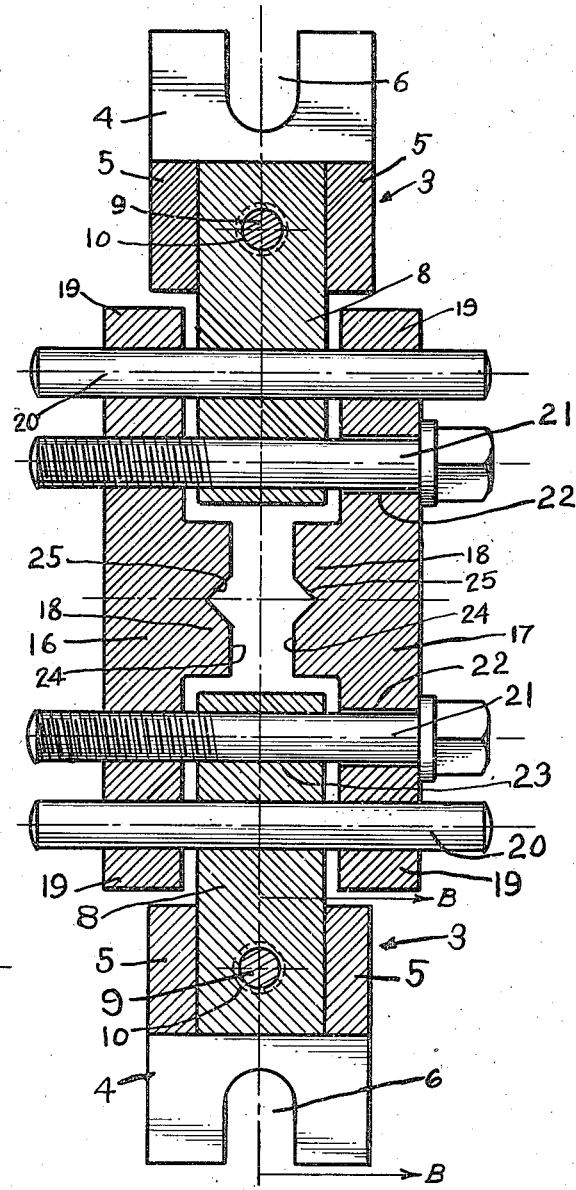
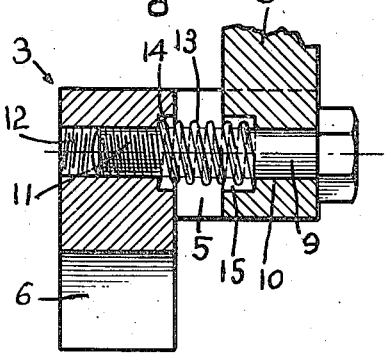
INVENTOR
Joseph C. Leone
by Heard Smith & Tennant
ATTORNEYS Patented Nov. 30, 1948

2,455,071

UNITED STATES PATENT OFFICE 2,455,071

LATHE DOG

Joseph C. Leone, Roxbury, Mass.

Application August 27, 1945, Serial No. 612,897

4 Claims. (Cl. 82—41)

This invention relates to lathe dogs and has for its object to provide a universal lathe dog which is relatively simple in construction and which is adapted to hold work of a wide range of sizes.

Further objects of the invention will appear from the following description of a device embodying the invention.

In the drawings:

Fig. 3 is an enlarged section on the line 3—3, Fig. 2.

Fig. 4 is a section on the line 4—4, Fig. 3.

Figure 1:
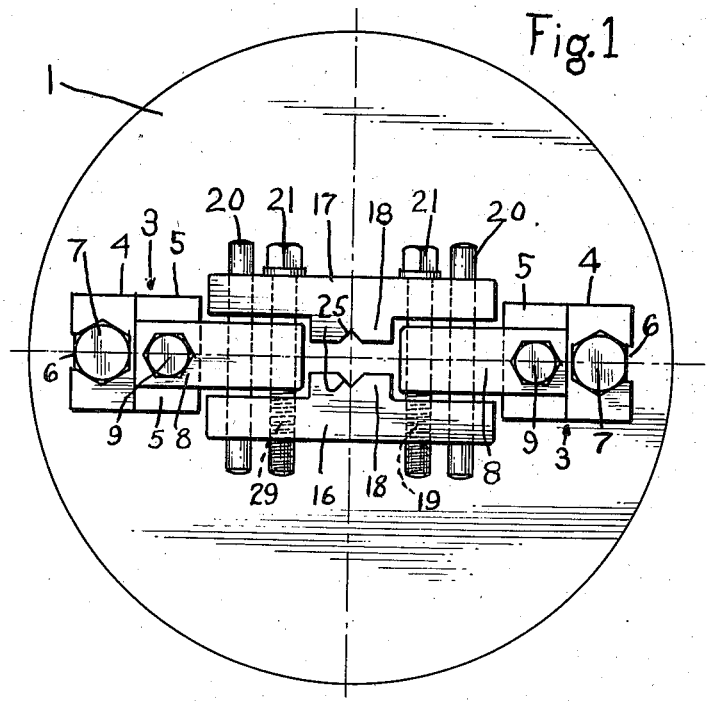
Fig. 1 is a front view of a lathe dog embodying my invention showing it applied to a face plate of a lathe.
Figure 2:
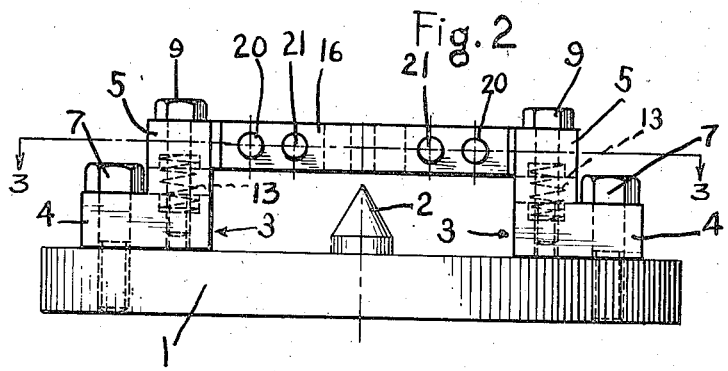
Fig. 2 is a top plan view of Fig. 1.

In the drawings 1 indicates the face plate of a lathe and 2 the lathe center.

My improved lathe dog comprises a pair of jaws between which the work is held, a pair of jaw supporting members on which the jaws are adjustably mounted, and a pair of anchoring members by which the jaw supporting members are anchored to the face plate 1.

The two anchoring members are indicated at 3 and each comprises a base portion 4 adapted to rest against and to be secured to the face plate 1, and two guiding flanges 5 which extend laterally from the base 4 and between which the jaw supporting members are received.

The base 4 of each anchoring member 3 is shown as provided with a slot 6 to receive a clamping bolt 7 by which the anchoring member is clamped to the face plate 1, said slots being screw threaded into the face plate.

The two jaw supporting members are indicated at 8. Each has a rectangular shape and extends in a direction transversely of the face plate and is of a size to fit between the flanges 5 of the corresponding anchoring member 3. Each jaw supporting member 8 is connected to its anchoring member by means of a bolt 9 which extends loosely through an aperture 10 in the outer end of the corresponding jaw supporting member, the inner end 11 of each bolt 9 being screw threaded into a screw thread socket 12 with which the anchoring member 3 is provided.

Encircling each bolt 9 is a spring 13, one end of which is received in a recess 14 formed in the anchoring member 3, the other end of which is received in a recess 15 with which the jaw-supporting member 8 is provided.

The springs 13 yieldingly hold the jaw-supporting members 8 against the heads of the bolts 9 but they permit an inward yielding movement of each jaw-supporting member as will be presently described.

The two work holding jaws which are carried by the jaw-supporting members are indicated at 16 and 17. Each jaw has a central work-engaging portion 18 situated between the inner ends of the jaw-supporting members 8, the outer end portions 19 of each jaw overlapping the jaw-supporting members 8.

Each jaw-supporting member has anchored in it a transversely extending guide pin 20, which pins extend through apertures formed in the outer ends 19 of the jaws. Each jaw has a free sliding fit on the pins and the latter serve to hold the jaws 17 and 18 in parallel relation.

Means are provided for adjusting the jaws toward and from each other and for this purpose there is provided two adjusting screws 21. These screws pass loosely through the apertures 22 formed in the jaw 17 and also loosely through apertures 23 formed in the inner ends of the jaw supporting members 8, and each adjusting bolt extends through and has screw threaded engagement with the jaw 16 as shown at 19. The adjusting screws 21 provide means by which the jaws 16 and 17 may be adjusted relative to each other and they also serve as means for limiting the movement of the jaws away from each other.

The work-engaging face 24 of each jaw may have different shapes or contours depending upon the character of the work which is being held between the jaws. For flat sided work these faces 24 might be preferably flat. For round work it would be preferable to have the faces provided with V notches 25 as shown so as to provide a better grip on the work.

In using my improved lathe dog, the work piece will be placed in the lathe between the lathe centers, the adjusting screws 21 having previously been manipulated to permit the jaws to be opened so that the work piece can be readily entered between them. The adjusting screws 21 are then operated to move the jaws toward each other until they have gripping engagement with the work so that rotation of the face plate will operate to rotate the work.

Another way of using the lathe dog is to insert one end of the work between the jaws and then clamp the jaws on to the work, and after the outer end of the work has been centered on the tail stock center, the latter may be moved axially to center the end of the work on the face plate center 2. After the jaws 16 and 17 are clamped to the work, the lengthwise movement of the work piece will move the jaws axially, such movement being permitted by the springs 13.

If a lot of identical flat sided pieces are to be operated on in the lathe, then the workman may so adjust the jaws 16 and 17 so as to permit the end of the work piece to be inserted between them with a small tolerance, and, after such adjustment has been made, the end of each work piece may be slid into position between the jaws and centered on the face plate center 2, after which, the tail stock center will be moved to engage the outer end of the load. Because of the fact that the work piece has flat sides it is not necessary to have the jaws clamped firmly against the article. The engagement of the flat sides of the work piece or article with the work-engaging faces 24 of the jaws will cause the rotation of the face plate to be transmitted to the work.

When the lathe dog is being used in this way, it is not necessary for the operator to adjust or manipulate the adjusting or clamping screws 21 to permit the work piece to be removed or to be inserted. This saves considerable time, thus reducing the overall time required for performing the same operation on a large number of identical pieces.

I claim:

1. A lathe dog comprising anchoring members, means fixedly securing said anchoring members to the face plate of the lathe on opposite sides of the center thereof, each anchoring member having laterally extending guiding flanges, two separate jaw holding members, one of which is received between the guiding flanges of each anchoring member and extends inwardly therefrom in a direction radially of the face plate, a pair of jaws mounted on the inner ends of the jaw supporting members, and means for adjusting the jaws toward and from each other comprising two adjusting screws, each extending loosely through one jaw and having screw-threaded engagement with the other jaw.

2. A lathe dog comprising anchoring members, means to attach said anchoring members to the face plate of the lathe on opposite sides of the center thereof, each anchoring member having laterally extending guiding flanges, two separate jaw holding members, one of which is received between the guiding flanges of each anchoring member and extends inwardly therefrom radially of the face plate, two jaw supporting pins, one of which extends transversely through each jaw supporting member, a pair of jaws, each of which is mounted on both pins, and means to adjust said jaws toward and from each other.

3. A lathe dog comprising anchoring members, means to fixedly secure said anchoring members to the face plate of a lathe on opposite sides of the center thereof, each anchoring member having laterally extending guiding flanges, two separate jaw holding members, one of which is received between the guiding flanges of each anchoring member and extends inwardly therefrom in a direction radially of said face plate, two jaw supporting pins, one of which extends transversely through each jaw supporting member, a pair of jaws, each of which is mounted on both of said pins, two adjusting screws, each extending freely through one jaw and one jaw supporting member and having screw-threaded engagement with the other jaw.

4. A lathe dog comprising anchoring members, means to fixedly secure said anchoring members to the face plate of a lathe on opposite sides of the center thereof, each anchoring member having laterally extending guiding flanges, two separate jaw holding members, one of which is received between the guiding flanges of each anchoring member and extends inwardly therefrom in a direction radially of said face plate, a separate jaw supporting pin carried by each jaw supporting member and extending parallel to the face plate, a pair of jaws each of which is slidably mounted on both of said jaw supporting pins, and two adjusting screws, each loosely extending through one jaw and having screw-threaded engagement with the other jaw.

JOSEPH C. LEONE.

REFERENCES CITED

The following references are of record in the file of this patent:

UNITED STATES PATENTS

| Number | Name | Date |
| --- | --- | --- |
| 995,003 | Hill | June 13, 1911 |
| 2,367,045 | Nightingale | Jan. 9, 1945 |